(12) United States Patent
Hanson Allen

(10) Patent No.: US 11,053,412 B1
(45) Date of Patent: Jul. 6, 2021

(54) TWO-SIDED GARMENT TAPE HAVING A NON-SLIP COATING AND METHODS OF MAKING AND USING THE SAME

(71) Applicant: Spanx, Inc., Atlanta, GA (US)

(72) Inventor: Wendy Hanson Allen, Atlanta, GA (US)

(73) Assignee: Spanx, Inc., Atlanta, GA (US)

( * ) Notice: Subject to any disclaimer, the term of this patent is extended or adjusted under 35 U.S.C. 154(b) by 330 days.

(21) Appl. No.: 15/377,652

(22) Filed: Dec. 13, 2016

Related U.S. Application Data

(63) Continuation of application No. 14/511,971, filed on Oct. 10, 2014, now abandoned.

(60) Provisional application No. 61/889,756, filed on Oct. 11, 2013.

(51) Int. Cl.
*A41F 17/00* (2006.01)
*C09J 7/02* (2006.01)
*C09J 7/04* (2006.01)

(52) U.S. Cl.
CPC .............. *C09J 7/02* (2013.01); *A41F 17/00* (2013.01); *C09J 7/0207* (2013.01); *C09J 7/0264* (2013.01); *C09J 7/04* (2013.01); *C09J 2301/122* (2020.08); *C09J 2301/302* (2020.08); *C09J 2301/304* (2020.08); *C09J 2400/263* (2013.01); *C09J 2421/00* (2013.01); *C09J 2423/046* (2013.01); *C09J 2423/106* (2013.01); *C09J 2433/00* (2013.01); *C09J 2467/006* (2013.01); *C09J 2475/006* (2013.01); *C09J 2483/00* (2013.01)

(58) Field of Classification Search
CPC .................................. D05D 2303/02
See application file for complete search history.

(56) References Cited

U.S. PATENT DOCUMENTS

| | | | |
|---|---|---|---|
| 2,768,902 A | 10/1956 | Scholl et al. | |
| 3,618,754 A * | 11/1971 | Hoey | A61F 13/0273 206/411 |
| 4,552,713 A * | 11/1985 | Cavicchioli | A63B 53/14 264/162 |
| 5,130,185 A | 7/1992 | Ness et al. | |
| 5,487,929 A * | 1/1996 | Rusincovitch, Jr. | B44C 5/0461 428/161 |
| 6,414,073 B1 | 7/2002 | Nakamura et al. | |
| 6,541,089 B1 | 4/2003 | Hamerski et al. | |
| 8,029,483 B2 | 10/2011 | Bonelli et al. | |
| 8,058,343 B2 | 11/2011 | Liu et al. | |
| 2002/0034628 A1 | 3/2002 | Luhmann et al. | |
| 2003/0134112 A1 | 7/2003 | Kreckel et al. | |
| 2006/0112591 A1* | 6/2006 | Lombardo | A43C 15/02 36/7.5 |
| 2006/0154053 A1 | 7/2006 | Cain et al. | |
| 2008/0113140 A1* | 5/2008 | Shah | B32B 7/12 428/40.6 |
| 2009/0145539 A1 | 6/2009 | Kreckel et al. | |
| 2010/0227102 A1 | 9/2010 | Keener et al. | |
| 2011/0002330 A1 | 1/2011 | Yurchenko | |
| 2012/0255677 A1 | 10/2012 | Kigami et al. | |

\* cited by examiner

*Primary Examiner* — Ian A Rummel
(74) *Attorney, Agent, or Firm* — Meunier Carlin & Curfman LLC

(57) ABSTRACT

Disclosed herein are two-sided garment tapes comprising a substrate having an adhesive coating on a first side and a non-slip coating on a second side. The substrate can comprise a fabric or plastic material. The adhesive coating can comprise a pressure-sensitive adhesive (PSA) or hot-melt adhesive. The non-slip coating can comprise silicone, an elastomer, or rubber. Methods of making and using the tape are also disclosed.

17 Claims, No Drawings

TWO-SIDED GARMENT TAPE HAVING A NON-SLIP COATING AND METHODS OF MAKING AND USING THE SAME

CROSS REFERENCE TO RELATED APPLICATIONS

This application is a continuation of U.S. application Ser. No. 14/511,971, filed Oct. 10, 2014, which claims the benefit of U.S. Provisional Patent Application No. 61/889,756, filed Oct. 11, 2013, all of which are incorporated herein by reference in their entireties.

FIELD OF THE DISCLOSURE

The present disclosure relates to two-sided garment tapes comprising a substrate having an adhesive coating on a first side and a non-slip coating on a second side. Methods of making and using the same are also disclosed.

BACKGROUND

Many people face recurring problems with garments and accessories riding up, sliding down, or otherwise falling out of ideal placement on the garment-wearer's body. Designers have produced a variety of garments and strategies to keep garments in place during wear. However, a continuing need exists for improved strategies for preventing garments from riding up, sliding down, or otherwise falling out of ideal placement on the garment-wearer's body.

SUMMARY OF THE DISCLOSURE

Disclosed herein are systems and methods related to two-sided garment tapes. An aspect of the present disclosure is directed to a double-sided garment tape. The double-sided garment tape can include a substrate having an adhesive coating on a first side. The double-sided garment tape can further include a non-slip coating on a second side. The adhesive can be adapted to removably adhere to an article of clothing or accessory.

Another aspect of the present disclosure is directed to a method of making a double-sided garment tape. The method can include providing a substrate and applying an adhesive coating to a first side of the substrate. The method can further include applying a non-slip coating to a second side of the substrate. The adhesive coating can include an exposed side adapted to removably adhere to an article of clothing or accessory.

A further aspect of the present disclosure is directed to a method for reducing slippage of a garment. The method can include providing a double-sided garment tape. The double-sided garment tape can include a substrate having an adhesive coating on a first side, a non-slip coating on a second side. The method can further include adhering the adhesive coating on the first side of the substrate to a garment and placing the garment on a garment wearer such that the non-slip coating on the second side of the substrate is configured to be in contact with the garment-wearer's skin. The adhesive coating can include an exposed side that is adapted to removably adhere to an article of clothing or accessory.

The description below sets forth details of one or more embodiments of the present disclosure. Other features, objects, and advantages will be apparent from the description and from the claims.

DETAILED DESCRIPTION

Disclosed herein are two-sided garment tapes having a substrate with an adhesive coating on a first side and a non-slip coating on a second side.

Substrate

The tapes disclosed herein comprise a substrate having a first side and a second side, wherein the two sides have different coatings. The substrate can be made of any material capable of functioning as the substrate layer of the two-sided tapes disclosed herein.

The substrate can comprise a fabric. The fabric can be a stretchy or non-stretchy fabric. For stretchy fabrics, the fabric can include an elastomer to provide the fabric with enhanced stretch recovery. In some embodiments, the elastomer is spandex. The fabric can be any type of knitted, woven or nonwoven fabric made from natural and/or synthetic fibers. In some embodiments, the substrate comprises papers. Exemplary substrate materials include, but are not limited to, cotton, glass cloth, polyethylene coated cloth, crepe, flatback, Kraft paper, tissue paper, polyester, nylon, and felt.

The substrate can comprise a plastic material. Exemplary plastic materials suitable for the substrate of the tape disclosed herein include, but are not limited to, polyolefins, such as polyethylene, including high density polyethylene, low density polyethylene, linear low density polyethylene, and linear ultra low density polyethylene, polypropylene, and polybutylenes; vinyl copolymers, such as polyvinyl chlorides, both plasticized and unplasticized, and polyvinyl acetates; olefinic copolymers, such as ethylene/methacrylate copolymers, ethylene/vinyl acetate copolymers, acrylonitrile-butadiene-styrene copolymers, and ethylene/propylene copolymers; acrylic polymers and copolymers; and combinations of the foregoing. Mixtures or blends of any plastic or plastic and elastomeric materials such as polypropylene/polyethylene, polyurethane/polyolefin, polyurethane/polycarbonate, polyurethane/polyester, can also be used. Substrates can be in the form of single or multi-layer films, non-woven films, porous films, foam-like films, and combinations of the foregoing. Substrates can also be prepared from filled materials, such as, for example, filled films, e.g., calcium carbonate-filled polyolefins. In some embodiments, the substrate is selected from polyethylene and polypropylene films, such as linear low density and ultra low density polyethylene films. The substrate can comprise a latex. The substrate can comprise elastic rubber. Substrates comprising a plastic material can be made by any known method of film forming, such as, for example, extrusion, co-extrusion, solvent casting, foaming, non-woven technology.

In some embodiments, the substrate comprises a material selected from the group consisting of polyester, polypropylene, polyethylene, polyvinyl chloride, polyimide, polyamide, polytetrafluoroethylene, polyvinyl alcohol, polyurethane, polyvinyl fluoride, and copolymers and combinations thereof. The substrate can comprise, for instance, aluminum, lead, or neoprene.

The substrate can be highly extensible. In some embodiments, the substrate is substantially non-recoverable. In some embodiments, the substrate is stretchable, deformable, and/or pliable. The substrate can have any thickness. In some embodiments, the substrate has a thickness allowing it to remain processable and handleable. In some embodiments, the substrate has a thickness allowing it to provide sufficient support for the non-slip coating and adhesive coating. In some embodiments, the thickness of the tape ranges from 10 micrometers to 250 micrometers.

Multiple substrate constructions can also be used. For example, the tape of this invention can comprise multiple layers (e.g., 2 layers, 3 layers, 4 layers, 5 layers, 6 layers, 7 layers, 8 layers, 9 layers, or 10 layers). The layers can be bonded one to another by adhesives, e.g., pressure-sensitive adhesives, or by laminating.

Adhesive Coating

The tape disclosed herein comprises an adhesive coating on a first side. The adhesive coating can comprise any adhesive capable of firmly adhering to a garment. In some embodiments, the adhesive is capable of being removed without damaging the garment. Those of ordinary skill in the art would readily recognize commercially available adhesives suitable for use in the tapes disclosed herein. The adhesive can comprise a releasable adhesive. The adhesive can comprise a removable adhesive. The adhesive can comprise a pressure-sensitive adhesive. The adhesive can comprise a hot-melt adhesive (to produce, for instance, an iron-on tape). Exemplary adhesives that may be suitable for this application include, for instance, those disclosed in U.S. Pat. No. 6,414,073. The adhesive can comprise a rubber, standard acrylic, modified acrylic, silicone, or combination thereof.

In some embodiments, the adhesive coating covers the entire first side (100%) of the substrate. In some embodiments, the adhesive coating covers 50% or more of the first side of the substrate (e.g., 60% or more, 70% or more, 80% or more, 90% or more). In some embodiments, the adhesive coating covers 95% or less of the first side of the substrate (e.g., 85% or less, 75% or less, 65% or less, 55% or less). The adhesive coating may be covered by a release liner (i.e., a peel-off strip of non-adhesive material).

Non-Slip Coating

The non-slip coating can be made of any material capable of reducing the likelihood of garment slippage while being worn by a garment-wearer. The non-slip coating can be less sticky or glue-like than the adhesive coating. The adhesive coating can have a greater adhesive strength than the non-slip coating. In some embodiments, the non-slip coating can comprise a non-slip fabric. The fabric can comprise any natural or synthetic fiber capable of reducing the likelihood of garment slippage. In some embodiments, the non-slip coating comprises an elastomer. In some embodiments, the non-slip coating comprises a synthetic material. The non-slip coating can comprise, for example, spandex, rubber, or silicone. The non-slip coating can be applied to the substrate in any manner capable of applying and adhering the non-slip coating to the substrate, including, but not limited to, laminating, melting, pouring, curing, spraying, or fusing. The non-slip characteristics of the non-slip coating can be provided by the type of material, thickness of the coating, pattern of the coating (e.g., dots, ribbing, concentric circles, pictures, parallel lines, criss-cross patterns, words such as SPANX, letters, or symbols), type of application of the coating, etc. The non-slip coating can have a uniform coating (i.e., the coating has the same thickness everywhere on the tape). The non-slip coating can have a varied thickness (e.g., it can be thicker at the center of the tape, it can be thicker at the edge of the tape, it can have patterned portions that are thicker than the non-patterned portions, etc.). The non-slip coating can comprise a filler material (e.g., coarse particles, silica) to increase the non-slip properties of the coating.

In some embodiments, the non-slip coating covers the entire second side (100%) of the substrate. In some embodiments, the non-slip coating covers 10% or more of the second side of the substrate (e.g., 20% or more, 30% or more, 40% or more 50% or more, 60% or more, 70% or more, 80% or more, 90% or more). In some embodiments, the non-slip coating covers 95% or less of the second side of the substrate (e.g., 85% or less, 75% or less, 65% or less, 55% or less, 45% or less, 35% or less, 25% or less, 15% or less).

Tape Properties

The tapes described herein can be of various shapes and sizes. In some embodiments, the tape is 0.5 inches or greater in length (e.g., 1 inch or greater, 2 inches or greater, 3 inches or greater, 4 inches or greater. 5 inches or greater, 6 inches or greater, 7 inches or greater, 8 inches or greater, 9 inches or greater, 10 inches or greater, 15 inches or greater, 20 inches or greater, 25 inches or greater, 30 inches or greater, 35 inches or greater). In some embodiments, the tapes are 150 inches in length or less (e.g., 100 inches or less, 50 inches or less, 40 inches or less, 30 inches or less, 20 inches or less, 10 inches or less, 5 inches or less, 2 inches or less). In some embodiments, the tape is 0.25 inches or greater in width (e.g., 0.3 inches or greater, 0.4 inches or greater, 0.5 inches or greater, 0.75 inches or greater, 1 inch or greater, 1.25 inches or greater). In some embodiments, the tape is 3 inches or less in width (e.g., 2 inches or less, 1.5 inches or less, 1 inch or less. 0.75 inches or less, 0.5 inches or less, 0.35 inches or less). In some embodiments, the tape is rectangular. In some embodiments, the tape is elliptical. In some embodiments, the tape is circular. The tape can be cut in any shape or pattern. The tape can be curved or arced. The tape can be any color, print, or pattern.

The tape can be provided as a set of tapes forming adjoining strips of a sheet of tapes. Individual pieces of tape can be separated by lines of perforations. The tape can be provided as a continuous roll.

The tape can be stretchy or non-stretchy. In some embodiments, the tape is stretchy and deformable, such that it is capable of returning to its original length and shape after stretching. In some embodiments, the tape is stretchy and non-deformable, such that it is not capable of returning to its original length and shape after stretching. In some embodiments, the tape is not stretchy, and would fracture or break if pulled.

In some embodiments, the tape is capable of being washed and reused, without losing its effectiveness.

Uses

The tapes disclosed herein can be used to help keep garments in place while being worn. In some embodiments, the garment is an undergarment (e.g., underwear, brassiere, shapewear). In some embodiments, the garment is a lower body garment (e.g., pants, jeans, skirts, leggings, shorts, hosiery). In some embodiments, the garment is a shirt, a jumper, swimwear, or a dress. The first side of the substrate (i.e., the side with the adhesive coating) can be adapted to adhere to the fabric of a garment, while the second side of the substrate (i.e., the side with the non-slip coating) can be adapted to be in contact with the garment-wearer's skin such that it helps keep the garment from slipping out of place. The tapes disclosed herein may be used to temporarily adhere portions of a garment to the skin of the wearer, to prevent undesirable exposure, or for support, for example at the bodice of a strapless gown or the hem of a slip.

Non-slip tape can be used on all manners of apparel or accessories to keep garments/accessories from riding up or slipping/falling down, falling open, or to keep in place in general. Applications of the tape include but are not limited to: camisoles, slips, mid thighs, capris, bodysuits, girl shorts, thongs, briefs, trunks, swimsuits, bras, panties, dresses, tops, pants, leggings, jeans, jackets, coats, shawls, ponchos, capes, blouses, shorts, skirts, shoes, shoulder pads, belts, scarves, bandanas, ascots, ties, gloves, and hats. The tape can be applied anywhere to the garment or accessory (e.g., hem, waist, collar, neckline, top opening, bottom opening, heel, rim, back, front, strap, leg opening, cuff).

The garments and methods of the appended claims are not limited in scope by the specific garments and methods described herein, which are intended as illustrations of a few aspects of the claims and any garments and methods that are functionally equivalent are intended to fall within the scope of the claims. Various modifications of the garments and methods in addition to those shown and described herein are intended to fall within the scope of the appended claims. Further, while only certain representative garments and method steps disclosed herein are specifically described, other combinations of the garments and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed.

What is claimed is:

1. A double-sided garment tape consisting of:
    a single-layer substrate having a first side and a second side, an exposed adhesive coating on the first side, the exposed adhesive coating having an adhesive strength, and an exposed non-slip coating on the second side, the exposed non-slip coating having an adhesive strength, wherein:
    the double-sided tape comprises at least one straight line of perforations across its width,
    the exposed adhesive coating removably adheres to an article of clothing or accessory, and the exposed non-slip coating contacts a wearer's skin, such that the article of clothing or accessory removably adheres to the wearer,
    the exposed non-slip coating comprises a polymer, the polymer comprising thermoplastic polyurethane, thermoplastic elastane, silicone rubber, styrene-butadiene-styrene, or styrene-isoprene-styrene, and
    the adhesive strength of the exposed adhesive coating is greater than the adhesive strength of the exposed non-slip coating.

2. The double-sided tape according to claim 1, wherein the substrate comprises a fabric.

3. The double-sided tape according to claim 2, wherein the fabric comprises an elastomer.

4. The double-sided tape according to claim 3, wherein the elastomer is spandex.

5. The double-sided tape according to claim 2, wherein the fabric comprises a regenerative fiber, cotton, polyester, nylon, or combinations thereof.

6. The double-sided tape according to claim 5, wherein the regenerative fiber comprises modal, tencel, viscose, cupro, acetate, or tri-acetate.

7. The double-sided tape according to claim 1, wherein the substrate comprises a plastic material selected from the group consisting of polyester, polypropylene, polyethylene, or copolymers or combinations thereof.

8. The double-sided tape according to claim 1, wherein the substrate is extensible, recoverable, or a combination thereof.

9. The double-sided tape according to claim 1, wherein the exposed adhesive coating comprises a pressure-sensitive adhesive, a hot-melt adhesive, or a combination thereof.

10. The double-sided tape according to claim 1, wherein the exposed adhesive coating comprises a rubber, a standard acrylic, a modified acrylic, a silicone, or a combination thereof.

11. The double-sided tape according to claim 1, wherein the exposed adhesive coating covers 100% of the first side of the substrate.

12. The double-sided tape according to claim 1, wherein the exposed adhesive coating covers from 75% to 90% of the first side of the substrate.

13. The double-sided tape according to claim 1, wherein the exposed non-slip coating comprises an elastomer.

14. The double-sided tape according to claim 1, wherein the tape is extensible, recoverable, or a combination thereof.

15. The double-sided tape according to claim 1, wherein the exposed non-slip coating is present on the substrate in a decorative design.

16. The double-sided tape according to claim 1, wherein the tape is from 0.5 inches to 30 inches in length.

17. The double-sided tape according to claim 1, wherein the tape is from 0.25 inches to 3 inches in width.

* * * * *